(12) United States Patent
Bastide et al.

(10) Patent No.: US 6,404,093 B1
(45) Date of Patent: Jun. 11, 2002

(54) BRUSH-HOLDER MOUNT FOR ELECTRIC MACHINES, SUCH AS MOTOR VEHICLE STARTER

(75) Inventors: Laurent Bastide; Pierre Magnier, both of Lyons (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 09/674,046
(22) PCT Filed: Feb. 24, 2000
(86) PCT No.: PCT/FR00/00455
   § 371 (c)(1),
   (2), (4) Date: Oct. 25, 2000
(87) PCT Pub. No.: WO00/51209
   PCT Pub. Date: Aug. 31, 2000

(30) Foreign Application Priority Data

Feb. 26, 1999 (FR) .............................. 99 02416

(51) Int. Cl.⁷ .............................................. H01R 39/38
(52) U.S. Cl. ......................................... 310/239; 310/42
(58) Field of Search ........................... 310/42, 90, 238, 310/239

(56) References Cited

U.S. PATENT DOCUMENTS 5,650,676 A * 7/1997 Blumenberg ................. 310/88
5,744,889 A   4/1998 Niimi ........................... 310/88

FOREIGN PATENT DOCUMENTS

| DE | 40 27 176 A | 3/1991 |
| FR | 2389253 A   | 11/1978 |
| FR | 2536602 A   | 5/1984 |

* cited by examiner

Primary Examiner—Nestor Ramirez
Assistant Examiner—Judson H. Jones
(74) Attorney, Agent, or Firm—Liniak, Berenato, Longacre & White

(57) ABSTRACT

Brush-holder fitting for an electric machine including two components (3, 4) affixed to one another, one (3) which features several guide cages (3c) which each accommodate one brush (1) and a spring (7), the other (4) which constitutes a component forming a seating which includes means allowing it to be assembled onto a metal bearing (5), the component (4) forming a seating including a hub (4h) accommodating an annular element (9) intended to provide rotational guidance for the shaft of the machine, characterized in that the hub (4h) is closed at its extremity intended to be opposite the shaft of the machine, the seating-forming component (4) being able, by itself, to ensure leaktightness with respect to the bearing.

15 Claims, 3 Drawing Sheets

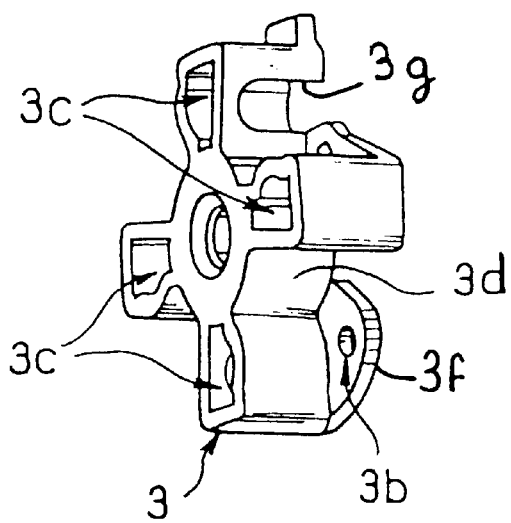
FIG_1a
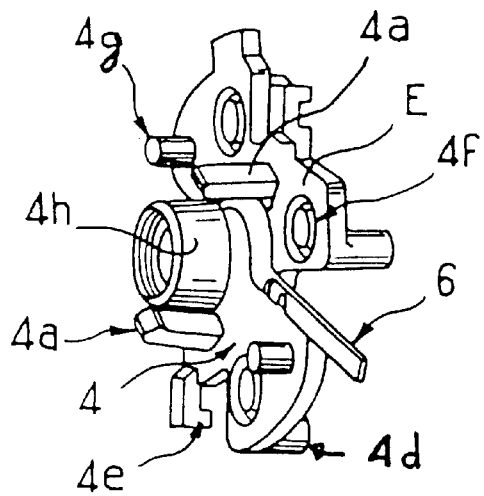
FIG_1b
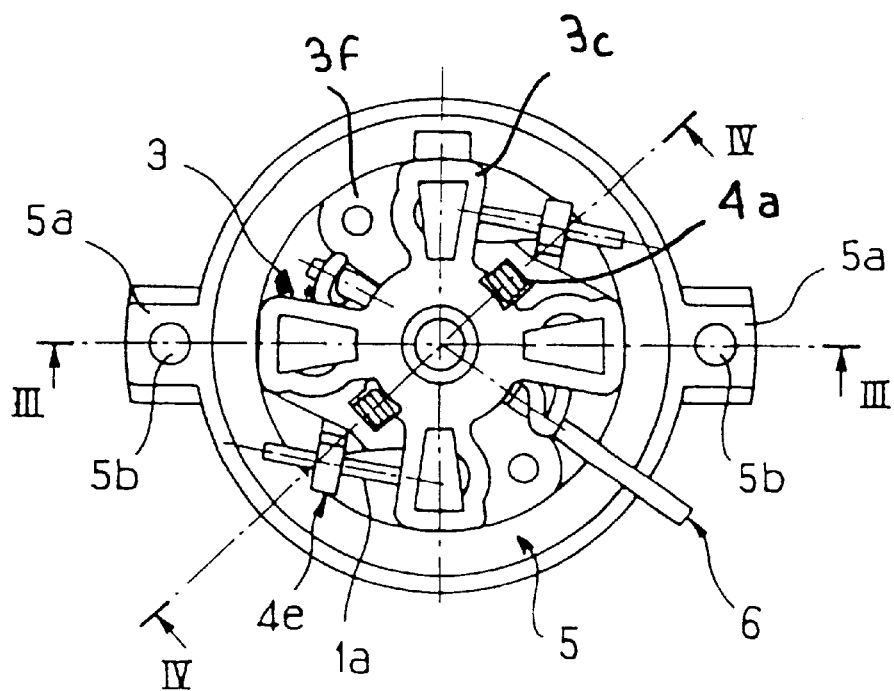
FIG_2

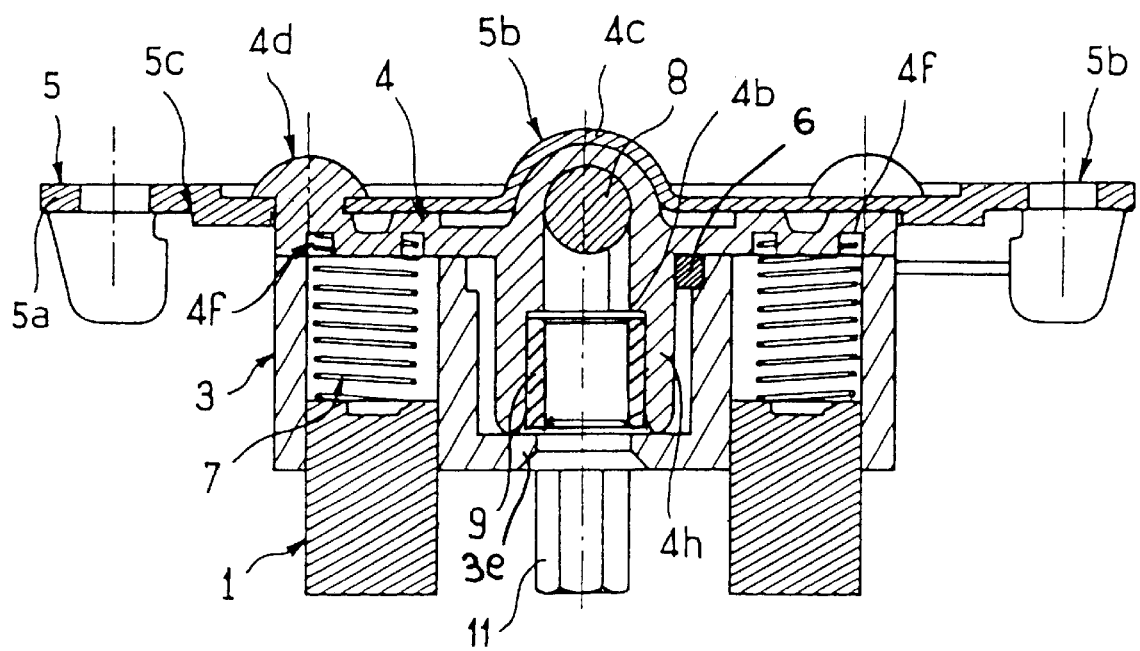
FIG_3
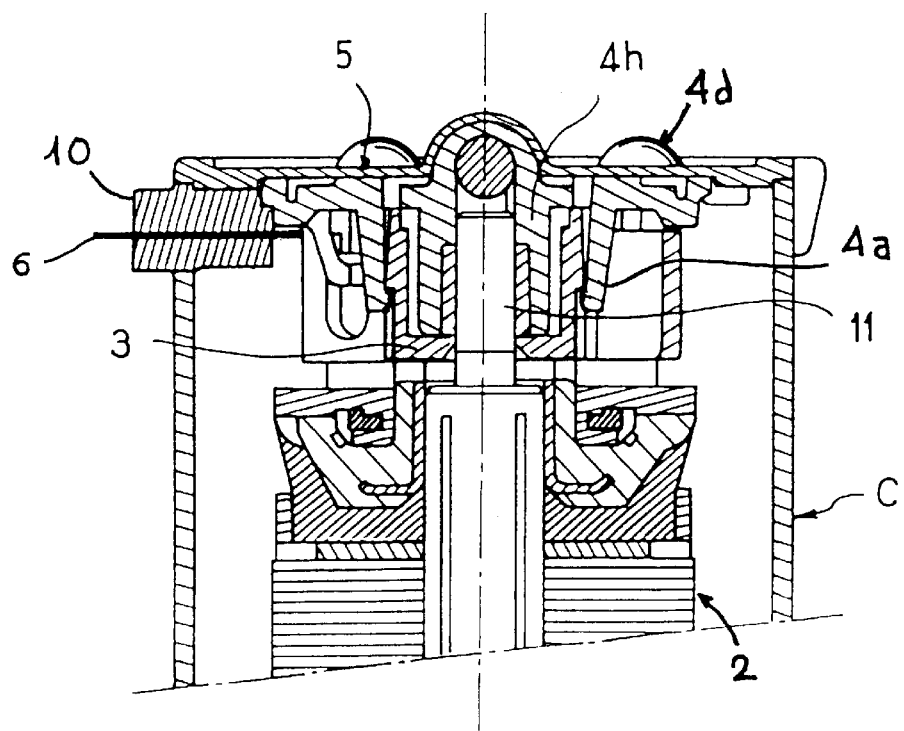
FIG_4

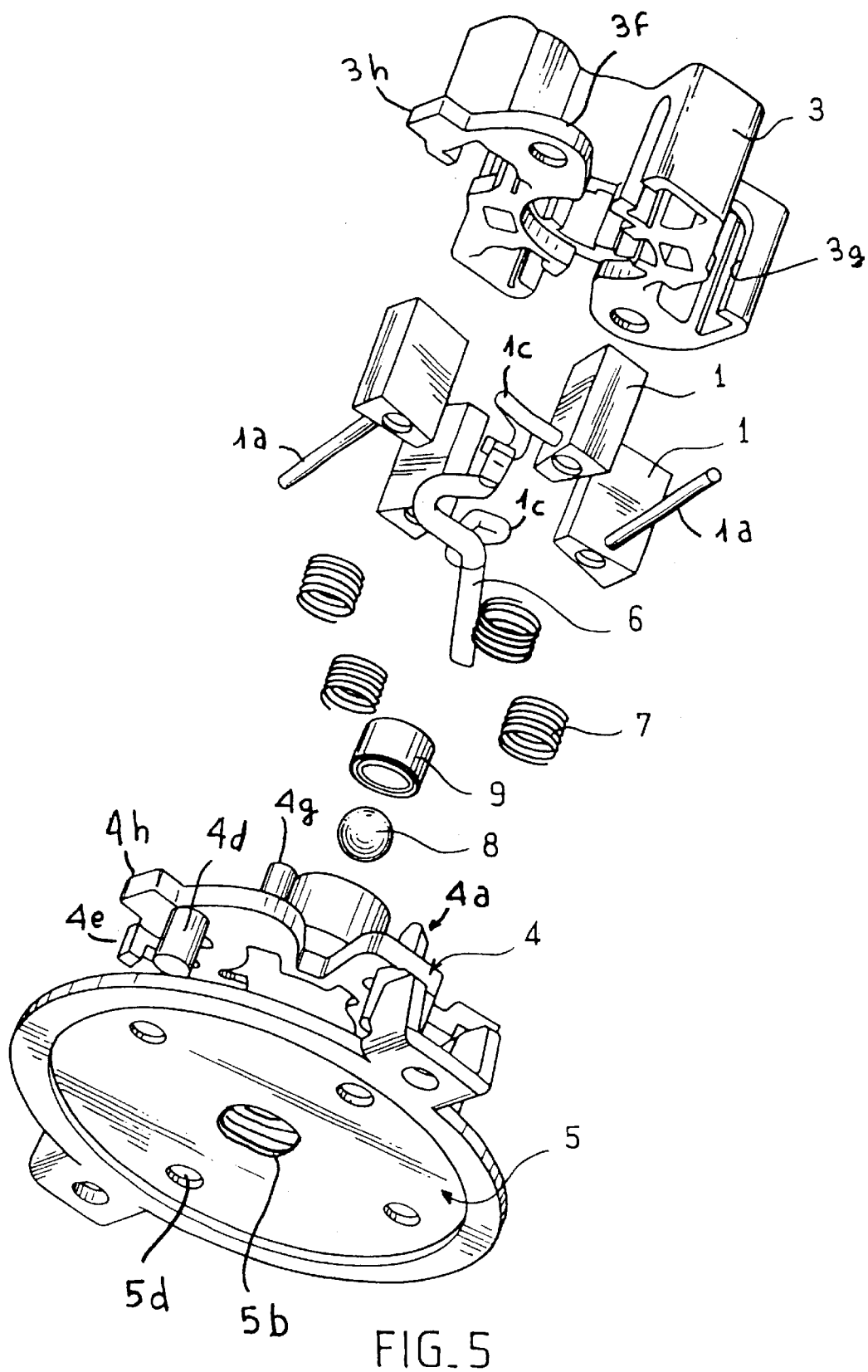
FIG_5

BRUSH-HOLDER MOUNT FOR ELECTRIC MACHINES, SUCH AS MOTOR VEHICLE STARTER

BACKGROUND OF THE INVENTION

1. Field of the Invention

The present invention relates to a brush-holder fitting, especially for a motor-vehicle starter.

2. Description of the Related Art

A brush-holder fitting is already known, especially from FR 2.389.253, including two components fixed to one another by means of elastic locking tabs. One of these two components is a seating intended to be affixed onto a bearing, while the other is a guide component which defines two cages in which the brushes are trapped with their springs when the said guide component is in place on the seating.

In order to make it possible to provide for these two components to be centred on the bearing, the seating features several orifices intended to accommodate centring pins carried by this bearing. Moreover, it is traversed by a cylindrical hub within which is accommodated an annular element called "bush" which is intended to provide rotational guidance of the shaft of the machine.

As will be understood, such a construction poses a problem of leaktightness and makes it necessary to provide, between the seating and the bearing, special purpose means for preventing any water penetration within the latter.

A bearing made of plastic is also known, especially from FR 2.536.602, which carries guide cages which are of a piece with the said bearing and which are moulded with it.

However, with such a bearing, putting the brushes and their springs in place in the guide cages proves to be a delicate task, since it is necessary, at the same time, to mount the bearing onto the chassis, mount the brushes and the springs within their cages, and centre the assembly with respect to the chassis of the electric machine and to the shaft of the rotor.

Moreover, this solution is not mechanically satisfactory, since the moulded bearing has a tendency to be deformed under the force of the tie rods which fix it to the chassis. The creep due to the ambient temperature aggravates this phenomenon.

SUMMARY OF THE INVENTION

One object of the invention is to remedy the drawbacks of the brush-holder fittings known at the present time and to propose a leaktight fitting, which is very simple to produce and has a reduced number of components.

To that end the invention proposes a brush-holder fitting for an electric machine including two components affixed to one another, one which features several guide cages which each accommodate one brush and at least one elastic element, the other which constitutes a component forming a seating which includes means allowing it to be assembled onto a metal bearing, the component forming a seating including a hub accommodating an annular element intended to provide rotational guidance for the shaft of the machine, characterised in that the hub is closed at its extremity intended to be opposite the shaft of the machine, the seating-forming component being able, by itself, to ensure leaktightness with respect to the bearing.

Advantageously, the seating-forming component features fixing pins intended to pass through complementary holes of the bearing.

This component forming the support plate also features fixing pins intended to pass through complementary holes of the brush-guidance component.

By flattening the pins, for example during an operation of hot riveting or by ultrasonic welding, it is possible to obtain leaktight fixings while making it possible to take up the manufacturing tolerances.

Clearly, other systems of assembly can be used such as screws, rivets, etc., but that is less advantageous since its relies on supplementary components. The pins here are moulded integrally with the support plate.

This support plate is equipped with elastically deformable tabs suitable for interacting, by clipping, with the studs moulded integrally with the guide component.

It is thus possible to carry out temporary assembling of the support plate with the guide component then to affix this subassembly onto the bearing and carry out final assembly of the support plate, with the guide component and with the bearing taking up the forces for fixing the assembly thus constituted, onto the chassis of the electric machine, such as a starter.

BRIEF DESCRIPTION OF THE DRAWINGS

Other characteristics and advantages of the invention will emerge further from the description which follows. This description is purely illustrative and not limiting. It should be read in the light of the attached drawings in which:

FIG. 1a is a representation, in perspective, of the guide component of a fitting in accordance with one possible embodiment of the invention;

FIG. 1b is a representation in perspective of a seating-forming component intended to be assembled onto the guide component of FIG. 1a;

FIG. 2 is a top view illustrating the assembling of the components of FIGS. 1a and 1b onto an electric-machine bearing;

FIG. 3 is a view in axial section along the line III—III of FIG. 2;

FIG. 4 is a representation in exploded perspective of the brush-holder fitting produced with the various elements represented in FIG. 3;

FIG. 5 is a diagrammatic representation in section rush-holder fitting in accordance with one possible embodiment of the invention.

DETAILED DESCRIPTION OF THE PREFERRED EMBODIMENTS

The brush-holder fitting illustrated in the figures includes a guide component 3 for brushes 1 and a support plate 4, which are intended to be assembled onto the rear bearing 5 of an electric machine, which is a motor-vehicle starter, for example.

The component 3 and the support plate 4 here are made of mouldable and electrically insulating material. In the figures, the support plate 4 and the component 3 are made of mouldable plastic, advantageously reinforced by fibres, such as glass fibres.

The material of the component 3 has properties which differ from those of the support plate 4.

More precisely, the material of the component 3 is more heat-resistant and more rigid than that of the support plate 4.

The high elasticity of the material of the support plate 4 makes it possible to produce elastically deformable fixing tabs 4a in it for temporary assembling by clipping, in the way described below, of the support plate 4 with the component 3, and forming of a captive subassembly which can be handled and transported, which is fixed subsequently onto the rear bearing 5 of the electric machine. The bearing 5 here is made of metal, and is of an annular shape.

The support plate 4 is shaped so as to be fixed onto the rear bearing 5 and so as to fix the guide component 3 permanently. The support plate 4 is therefore an intermediate component between the bearing 5 and the component 3.

Here, the fixings of the component 3 and of the bearing 5 to the support plate 4 are advantageously leaktight fixings.

The support plate 4 serves as a back plane for the guide cages 3c which the component 3 features.

More precisely, the guide component 3 (FIG. 1a) includes four guide cages 3c which are moulded in one piece with a central body 3d of generally cylindrical shape. The cages 3c are distributed, here regularly, around the central body 3d.

Each guide cage 3c is of generally trapezoidal shape in section, and is intended to accommodate one brush 1, as well as an elastic element 7, here in the form of a spring.

The brushes 1 are intended to come into contact, in a way which is known in itself, with collector tracks which the electric machine features.

This guide component 3 is produced by moulding from a material which is electrically insulating and which is chosen to resist the high operating temperatures of the brushes 1. The material of the component 3 is a thermosetting resin, for example.

The support plate 4 (FIG. 1b) features a main part of generally flat shape which defines the seating E on which the component 3 is intended to come to bear. The seating E constitutes the back plane of the guide cages 3c, and features, on each of its faces, projecting pins 4g and 4d directed axially in opposite directions.

On its face intended to accommodate the said component 3, this seating E carries, in projection, two elastically deformable locking tabs 4a which terminate in projecting hooks intended to interact, by clipping, with complementary studs (not referenced in FIG. 4) which the central body 3d of the component 3 features between two cages 3c. The tabs 4a are inclined.

It also carries centring pins 4g intended to interact with complementary orifices 3b which the component 3 features.

The orifices 3b belong to lugs 3f each linking one cage 3c to the central body 3d. These lugs are intended to come into contact with the seating E and stiffen the component 3.

Moreover, the seating of the support plate 4 exhibits annular grooves 4f which are intended to enable centring of the springs 7 and which are intended to accommodate the latter at their extremity opposite the brushes 1.

The springs 7 here are coil springs. In a variant, the springs 7 may have another shape. The brushes 1 are, in a general way, subject to the action of elastic elements 7 bearing on the seating E.

The support plate 4 also includes a cylindrical hub 4h which is intended to be accommodated in the central body 3d when the guide component 3 is in place on the support plate 4. The hub 4h is internally of stepped diameter with a shoulder 4b formed at the change of diameter.

The support plate 4 is produced by moulding from an electrically insulating material. This material is, for example, of thermoplastic type and is chosen in such a way as to allow sufficient elasticity for the fixing tabs 4a.

As can be seen in FIG. 4, the central body 3d externally exhibits portions of frustoconical shape delimited by the abovementioned studs. The tabs 4a, by interacting with this portion, are allowed to deploy until they come into engagement with the studs.

An annular bush 9 is force-fitted within the hub 4h. This bush 9 is intended to provide for the shaft of the electric machine to rotate with respect to the bearing 5 and is made of a friction material of the bronze type, or equivalent.

The friction between this bush 9 and the hub 4h is sufficient to prevent this bush 9 rotating with respect to the support plate 4. This link between the hub 4h and the bush 9 may moreover be reinforced by the choice, for the hub 4h and the said bush 9, of complementary shapes opposing any rotation with respect to one another.

In a variant, the bush is fixed by friction welding to the hub 4h.

Within the hub 4h, this bush 9 is in abutment against the shoulder 4b which the said hub 4h features. It is prevented from coming out of the said hub, moreover, by a return wall 3e which partially closes the central body 3d at its extremity opposite the seating E of the support plate 4 and which, with the shoulder 4b, prevents any axial displacement of the bush 9.

The wall 3e is turned radially towards the inside of the body 3d and is holed for a shaft 11 to pass.

In the figures, the bearing 5 has been represented in the form of a flat bearing. Other types of bearings could, obviously, also be envisaged and especially bell-shaped bearings.

The bearing 5 includes two diametrally opposed lugs 5a which each feature an orifice 5d intended to allow the said bearing to be fixed onto the chassis of the electric machine, by means of tie rods (not represented). The bearing 5 moreover, between these lugs 5a and the rest of the said bearing 5, features a step change 5c which provides for the said bearing 5 to be centred on the chassis C of the electric machine equipped, within the chassis C, in a known way, with a rotor 2 and with a rotor shaft 11.

Moreover, the support plate 4 features, on its face which is directly facing the bearing 5, at least one prominence 4c intended to be accommodated in a complementary cell 5b which the said bearing 5 features. This cell 5b does not open out, so that the bearing is leaktight. In the example illustrated in the figures, this prominence 4c is a central prominence and consists of the wall which closes off the hub 4h. Here the prominence 4b is in the form of a spherical cap.

The support plate 4 further includes, on the same side, pins 4d accommodated in holes formed in the bearing 5. These pins 4d are intended to be hot-riveted or ultrasonically riveted, once the support plate 4 is in place on the bearing 5. This riveting confers excellent leaktightness on the assembly. Other assembling systems may be envisaged, obviously.

The support plate 4, within its hub 4h, between the back plane which the central prominence 4c constitutes and the bush 9, accommodates an element 8 on which the rotor shaft 11 is intended to come into axial abutment.

This element 8 is, for example, a ball which is pushed into the support plate 4 and which is held in it by friction. By acting on the force exerted on the said ball 8 when it is pushed in, its position is adjusted as a function of the length of the shaft end 11 in such a way as, after the starter has been assembled, to have rotor axial play of reduced value.

In other embodiments, the spherical ball can be replaced by a component of another geometry, pushed into the support plate.

In yet another variant, this abutment can be produced as a shape moulded integrally with the support plate.

Equally, on its face which receives the guide component 3, the support plate 4 includes tabs 4e (FIGS. 1b and 2) in hook shape, which are intended to serve as a retaining structure for the wire elements 1a intended for linking two of the brushes to earth, before these wire elements are soldered to the bearing 5.

The wire elements 1a are integral with the said brushes, while the tabs 4e extend in projection parallel to the seating E and perpendicularly with respect to the tabs 4a and to the mutually parallel pins 4g, 4d.

The support plate 4 moreover carries a grommet element 10 made of a flexible insulating material (plastic, for example). This grommet element 10 is intended to pass through the chassis C of the electric machine in order to provide the connection to a positive power-supply terminal for the two brushes which are not earthed. This grommet element is compressed between the bearing 5 and the chassis, thus achieving good leaktightness.

The assembling of the elements which have just been described is carried out in the following way.

The two positive brushes 1 carry, fixed to them, wire elements 1c soldered beforehand to the connection element 6 which is intended to be placed in the grommet element 10. They are then mounted into the guide cages 3c, with the other two brushes.

Then, the four brush springs 7 are also inserted into the said cages 3c.

The support plate 4, fitted beforehand with the bush 9 and with the ball 8, is assembled onto the component 3, the two components being held with respect to one another by the elastic locking tabs 4a. Thus a one-piece subassembly is obtained, which is easy to stock or to handle in a production workshop.

This subassembly is then mounted onto the bearing 5 by placing the wire elements 1a under the tabs 4e of the support plate. Then riveting is carried out, by way of the pins 4d.

Next, in order to hold the component 3 permanently on the support plate 4, the pins 4g are riveted. The fixing tabs 4a in fact have only a temporary role and are intended only to facilitate the pre-assembling before the riveting operations.

The ends of the links 1a are then soldered electrically onto the metal bearing 5 and the grommet 10 is put in place.

Finally, the complete bearing is mounted onto the end of the shaft 11 and the chassis C.

Tie rods passing through the lugs 5a of the bearing 5 allow the latter to be fixed onto the motor, and put the grommet 6 [sic] under compression, which ensures the leaktightness and the insulation of the electrical link.

As will be understood, such a fitting exhibits numerous advantages.

It is easy to assemble onto the starter. In particular, the components 3 and 4 can be assembled with the brushes 1, the springs 7, the connections, the bearing 5, the grommet 6 [sic], the bush 9 and the rotor abutment 8 independently of the rest of the starter.

Equally, the various elements of this subassembly are able to be assembled together in a simple way, without additional fixing components. This results in a reduction in costs.

Moreover, the fitting which has just been described ensures the leaktightness of the rear part of the electric machine by itself, and does so without any additional, special-purpose component being necessary.

It will be noted that the bearing 5 features lugs 5a which are stiffened by returns. The bearing 5 is also stiffened by the cell 5b and is shaped to take up the forces engendered by the tie rods in such a way that the guide component 3 and the support plate 4 are relieved.

It will also be noted that the wall 3a is chamfered in order to facilitate the mounting of the shaft 11 and that the cages 3c are equipped with blind apertures 3g in order better to discharge the heat and pass the wire elements 1a, 1c of the brushes 1.

In a variant, the cages 3c can be equipped with a coating constituting a thermal barrier as described in the abovementioned document FR-A-2 536 602.

It will be understood that the star-like shape of the guide component 3, with its four cages 3c, extending in projection, here radial, outwards with respect to the central body 3d, makes it possible to house and to install outside the body 3d, between the cages 3c, the lugs 3f with holes 3b, the associated pins 4g and the tabs 4e, 4a.

As can be seen, in FIG. 5 for example, the component 3 and the support plate 4 each feature a tab, 3h and 4h respectively, intended to come into contact with one another in order to form an indexing device and to index the component 3 with respect to the support plate 4, in the correct angular position. Obviously, the indexing device may be of another shape.

In a general way, the indexing means act between the support plate 4 and the component 3. By virtue of the invention, and also of the star-like shape of the component 3, the support plate 4 has a maximum number of functions.

The tab 3h extends in projection outwards with respect to one of the guide cages 3c, being moulded integrally in the same material as this cage 3.

The tabs 4e, 4a are grouped in diametrally opposed pairs, the tabs 4e being further from the central body 3d than the tabs 4a which are intended to be hooked onto the body 3d. The pins 4g mounted in the holes 3b alternate circumferentially with the pairs of tabs 4e, 4a.

The same goes for the wire elements 1a, 1c, which prevent the brushes escaping, as well as the springs 7, the apertures 3g formed in the cages 3c for the said elements 1a, 1c to pass being of oblong shape and open in the region of the seating E in order to allow maximum wear of the brushes 1.

It will be noted that the central body 3d is staged in diameter internally in order for a wire element of the connection 6 to pass.

What is claimed is:

1. Brush-holder fitting for an electric machine including two components (3, 4) affixed to one another, one component (3) which features several guide cages (3c) which each accommodate one brush (1) and elastic element (7), the other component (4) which constitutes a seating-forming component forming a seating which includes means allowing the seating-forming component to be assembled onto a metal bearing (5), the component (4) forming a seating including a hub (4h) accommodating an annular element (9) intended to provide rotational guidance for a shaft (11) which said machine features, wherein the hub (4h) is closed at an extremity intended to be opposite the shaft of the machine, the seating-forming component (4) being able, by itself, to ensure leaktightness with respect to the bearing.

2. Fitting according to claim 1, wherein the seating-forming component (4) features fixing pins (4d) intended to pass through complementary holes of the bearing (5).

3. Fitting according to claim 2, wherein the fixing pins (4d) are riveted onto the bearing (5).

4. Fitting according to claim 1, wherein the annular element (9) intended to provide rotational guidance for the shaft of the machine is at least partially held by friction in the hub.

5. Fitting according to claim 1, wherein the hub (4h) features an internal shoulder (4b) forming an abutment for the annular element intended to provide the rotational guidance for the shaft of the machine.

6. Fitting according to claim 5, wherein the component (3) which carries the guide cages carries a central cylindrical body which covers over the hub and which is partially closed by a return wall (3e) which, with the internal shoulder, prevents any axial displacement of the annular element intended to provide the rotational guidance for the shaft of the machine.

7. Fitting according to claim 1, wherein the component forming the seating carries at least one centering prominence (4c) intended to be accommodated in a complementary cell (5b), which does not open out, which the bearing (5) features.

8. Fitting according to claim 1, wherein an axial-abutment element (8) is held by friction within the hub (4h).

9. Fitting according to claim 8, wherein said axial-abutment element (8) is a ball.

10. Fitting according to claim 1, wherein the component which carries the guide cages (3c) features a central body (3d) which covers over the hub (4h) of the seating-forming component (4), wherein the guide cages (3c) extend in projection outwards with respect to the central body (3d) and wherein the seating-forming component (4) features, in projection, elastically deformable tabs (4a) each intended to come to be fixed temporarily by clipping onto the central body (3d) between two guide cages (3c).

11. Fitting according to claim 10, wherein the component (4) forming a seating (E) features, in projection, fixing pins (4g) each passing, between two guide cages (3c), through a complementary hole (3d) formed in a lug (3f) linking one of the guide cages (3c) to the central body (3d).

12. Fitting according to claim 11, wherein the seating-forming component includes tabs in hooked shape intended to accommodate a wire element intended for linking a brush to earth.

13. Fitting according to claim 12, wherein the hook-shaped tabs (4e) are located outside the central body (3d) between two guide cages (3c).

14. Fitting according to claim 13, wherein the hook-shaped tabs (4e) are grouped in pairs with the elastically deformable tabs (4a) between two guide cages (3c) outside the central body (3d) and wherein said pairs alternate circumferentially with the lugs (3f).

15. Fitting according to claim 10, wherein indexing means (3h, 4h) act between the two components (3, 4).

* * * * *